United States Patent
Yuki

(10) Patent No.: US 11,135,576 B2
(45) Date of Patent: Oct. 5, 2021

(54) HONEYCOMB STRUCTURE

(71) Applicant: NGK Insulators, Ltd., Nagoya (JP)

(72) Inventor: Kazuya Yuki, Nagoya (JP)

(73) Assignee: NGK Insulators, Ltd., Nagoya (JP)

(*) Notice: Subject to any disclaimer, the term of this patent is extended or adjusted under 35 U.S.C. 154(b) by 227 days.

(21) Appl. No.: 16/285,860

(22) Filed: Feb. 26, 2019

(65) Prior Publication Data

US 2019/0283012 A1  Sep. 19, 2019

(30) Foreign Application Priority Data

Mar. 19, 2018  (JP) .............................. JP2018-050887

(51) Int. Cl.
  *B01J 35/04*   (2006.01)
  *F01N 3/022*   (2006.01)
  *F01N 3/28*    (2006.01)

(52) U.S. Cl.
  CPC ............ *B01J 35/04* (2013.01); *F01N 3/0222* (2013.01); *F01N 3/2828* (2013.01); *B01J 2219/32296* (2013.01); *F01N 2330/34* (2013.01); *F01N 2330/48* (2013.01)

(58) Field of Classification Search
  None
  See application file for complete search history.

(56) References Cited

U.S. PATENT DOCUMENTS

| 2005/0214503 A1 | 9/2005 | Sakamoto | |
| 2008/0160250 A1* | 7/2008 | Adler | B01D 46/247 428/116 |
| 2008/0274324 A1* | 11/2008 | Mizutani | F01N 3/0222 428/73 |
| 2009/0239028 A1* | 9/2009 | Ohno | B01D 46/2466 428/116 |
| 2009/0239744 A1* | 9/2009 | Ohno | C04B 28/26 502/328 |
| 2011/0237427 A1* | 9/2011 | Saito | B01D 46/2455 502/100 |
| 2014/0296054 A1 | 10/2014 | Kikuchi | |

FOREIGN PATENT DOCUMENTS

| EP | 2 366 444 B1 | 6/2013 |
| EP | 2 784 049 A2 | 10/2014 |
| JP | 2003-340224 A1 | 12/2003 |

OTHER PUBLICATIONS

German Office Action (with English translation), German Application No. 10 2019 202 929.9, dated Nov. 23, 2020 (7 pages).

* cited by examiner

*Primary Examiner* — David Sample
*Assistant Examiner* — Elizabeth Collister
(74) *Attorney, Agent, or Firm* — Burr & Brown, PLLC

(57) ABSTRACT

A honeycomb structure includes plugged honeycomb segments, circumferential bonding layers, central bonding layers and a circumferential wall. An angle θ between a first direction of extension of at least one of the circumferential bonding layers and a second direction of extension of a line segment that connects a centroid of the honeycomb structure and an intersection point at which the circumferential bonding layer in the first direction intersects with the circumferential wall is 25 to 45°, and the outermost segment bonded by the circumferential bonding layer in the first direction exists on a parallel line to a direction of extension of the central bonding layer passing through the centroid.

8 Claims, 7 Drawing Sheets

HONEYCOMB STRUCTURE

The present application is an application based on JP 2018-050887 filed on Mar. 19, 2018 with Japan Patent Office, the entire contents of which are incorporated herein by reference.

BACKGROUND OF THE INVENTION

Field of the Invention

The present invention relates to a honeycomb structure. More particularly, the present invention relates to a segmented-structure honeycomb structure in which a plurality of honeycomb segments are bonded with bonding layers.

Description of the Related Art

Exhaust gas emitted from various internal combustion engines such as a diesel engine includes a great deal of particulate matter such as dust, soot, and carbon particulates. For this reason, a purification device that purifies exhaust gas emitted from an automobile that uses a diesel engine as a power source employs a diesel particulate filter (DPF), for example. Hereinafter, particulate matter may be called "PM". Moreover, a diesel particulate filter may be called "DPF".

The DPF is commonly a structure that is sectioned by porous partition walls into a plurality of cells acting as fluid through channels and makes the porous partition walls configured to form the cells function as a filter by alternately plugging the open ends of the plurality of cells.

When the DPF continues to remove PM in the exhaust gas, the PM becomes deposited within the DPF and thus the purification efficiency is decreased and the pressure loss of the DPF is increased. Therefore, the purification device using the DPF needs to perform a "reproduction process" of combusting the deposited PM by using high-temperature exhaust gas generated from the diesel engine.

In the case of the reproduction process described above, because a high thermal stress is generated in the DPF due to the combustion heat of the PM, measures to prevent the breakage of the DPF are necessary. Particularly, a passenger car and the like have a tendency to increase the frequency of reproduction process and thus measures to prevent the breakage of the DPF are particularly important.

Conventionally, as a technology for preventing the breakage of such the DPF, there has been proposed a technology for bonding a plurality of segments each having honeycomb structure via bonding materials without manufacturing DPF having one honeycomb structure (see Patent Document 1). Hereinafter, "a segment having honeycomb structure" may be called "a honeycomb segment". Moreover, "a honeycomb structure in which a plurality of honeycomb segments are bonded with bonding layers" may be called "a segmented-structure honeycomb structure". In addition, a honeycomb structure to be contrasted with such the segmented-structure honeycomb structure includes a honeycomb structure in which all partition walls constituting the honeycomb structure form one continuous structural object. The "honeycomb structure in which all partition walls form one continuous structural object" may be called a "monolithic honeycomb structure".

[Patent Document 1] JP-A-2003-340224

The segmented-structure honeycomb structure has a problem that the total thermal stress of the honeycomb structure can be absorbed but cracks etc. are easy to occur in the bonding layers of the circumferential portion of the honeycomb structure. For example, the honeycomb structure for DPF may load an oxidation catalyst in order to promote the oxidation and combustion of PM during a reproduction process. When loading the oxidation catalyst, the honeycomb structure is coated with slurry including the oxidation catalyst and then is subject to heat treatment at high temperature to be baked, but cracks etc. may occur in the bonding layers of the circumferential portion during this heat treatment. Moreover, even in sudden temperature rising and sudden temperature falling of the exhaust gas generated during driving a vehicle, cracks etc. may occur in the bonding layers.

Recently, in large trucks etc. there is a tendency to switch from the DPF made of cordierite to the DPF made of SiC due to the request of downsizing etc. of DPF, and the adoption of the DPF made of large-sized SiC increases. The large-sized DPF has a problem that a temperature difference between the inside and outside of the DPF more easily occurs, and thus a crack easily occurs when loading a catalyst.

Moreover, in employing SiC, unified DPF obtained by unifying SCR and DPF loads a great deal of catalytic amount, and materials having low heat conduction with high porosity tend to be used as the materials of the DPF. Herein, "SCR" is an abbreviation of "Selective Catalytic Reduction: selective reduction NOx catalyst". Because the high-porosity materials have characteristically low heat conduction, using the high-porosity materials as the material of DPF leads to a problem that a temperature difference between the inside and outside of DPF easily occurs, and thus a crack easily occurs when loading a catalyst.

The present invention has been achieved in view of the problems of the above conventional technology. According to the present invention, there is provided a honeycomb structure that can effectively suppress the extension of a crack occurring in bonding layers for bonding a plurality of honeycomb segments.

SUMMARY OF THE INVENTION

According to the present invention, there is provided a honeycomb structure to be described below.

According to a first aspect of the present invention, a honeycomb structure is provided, including: a plurality of prismatic columnar honeycomb segments; bonding layers that bond side faces of the plurality of honeycomb segments with respect to each other; and a circumferential wall that is disposed to surround an outer circumference of a honeycomb segment bonded body obtained by bonding the honeycomb segments with the bonding layers in a state where the honeycomb segments are arrayed in a grid pattern, wherein each of the honeycomb segments includes porous partition walls disposed to surround a plurality of cells extending from an inflow end face to an outflow end face in an axial direction and a segmented outer wall disposed to surround the partition walls, an end of each of the cells in each of the honeycomb segments is plugged by a plugging portion at any one of the inflow end face and the outflow end face, the bonding layers include circumferential bonding layers which bond outermost segments arranged on an outermost circumference of the honeycomb segment bonded body and central bonding layers which bond central segments other than the outermost segments, in the inflow end face of the honeycomb segment bonded body, a direction of extension of at least one of the circumferential bonding layers is defined as a first direction L1 and a direction of extension of a line segment OP that connects a centroid O of the honeycomb segment bonded body and an intersection point P at which the circumferential bonding layer in the first direction L1 intersects with the circumferential wall is defined as a second direction L2, a size of an angle θ between the first direction L1 and the second direction L2 is 25 to 45°, and the outermost segment, which is bonded by the circumferential bonding layer having the size of the angle θ of 25 to 45°, exists on a parallel line to a direction of extension of the central bonding layer passing through the centroid O of the honeycomb segment bonded body in the inflow end face of the honeycomb segment bonded body.

According to a second aspect of the present invention, the honeycomb structure according to the first aspect is provided, wherein a number of the circumferential bonding layers having the size of the angle θ of 25 to 45° in the inflow end face of the honeycomb segment bonded body is two to eight.

According to a second aspect of the present invention, the honeycomb structure according to the first or second aspects is provided, wherein a shape of the central segments in the inflow end face of the honeycomb segment bonded body is a quadrangle.

According to a second aspect of the present invention, the honeycomb structure according to any one of the first to third aspects is provided, wherein a width of each of the bonding layers in the inflow end face of the honeycomb segment bonded body is 0.3 to 3.0 mm.

Effects of the Invention

The honeycomb structure according to the present invention can effectively suppress the occurrence of cracks occurring in the bonding layer of the honeycomb segment bonded body. In other words, the honeycomb structure according to the present invention is configured so that the circumferential bonding layer for bonding the outermost segments arranged on the outermost circumference of the honeycomb segment bonded body is located to have the size of the angle θ of 25 to 45° between the first direction L1 and the second direction L2. Because the circumferential bonding layer is arranged to avoid the radiation direction in which a crack is easy to occur in the bonding layer, it is possible to effectively suppress the occurrence of the crack occurring in the bonding layer (i.e., the circumferential bonding layer) of the circumferential portion of the honeycomb segment bonded body.

DESCRIPTION OF THE PREFERRED EMBODIMENTS

Hereinafter, exemplary embodiments of the present invention will be explained, but the present invention is not limited to the following embodiments. Therefore, it should be understood that those in which modifications, improvements, etc. have been appropriately added to the following embodiments based on ordinary knowledge of those skilled in the art without departing from the spirit of the present invention are within the scope of the present invention.

(1) Honeycomb Structure

Figure 1:
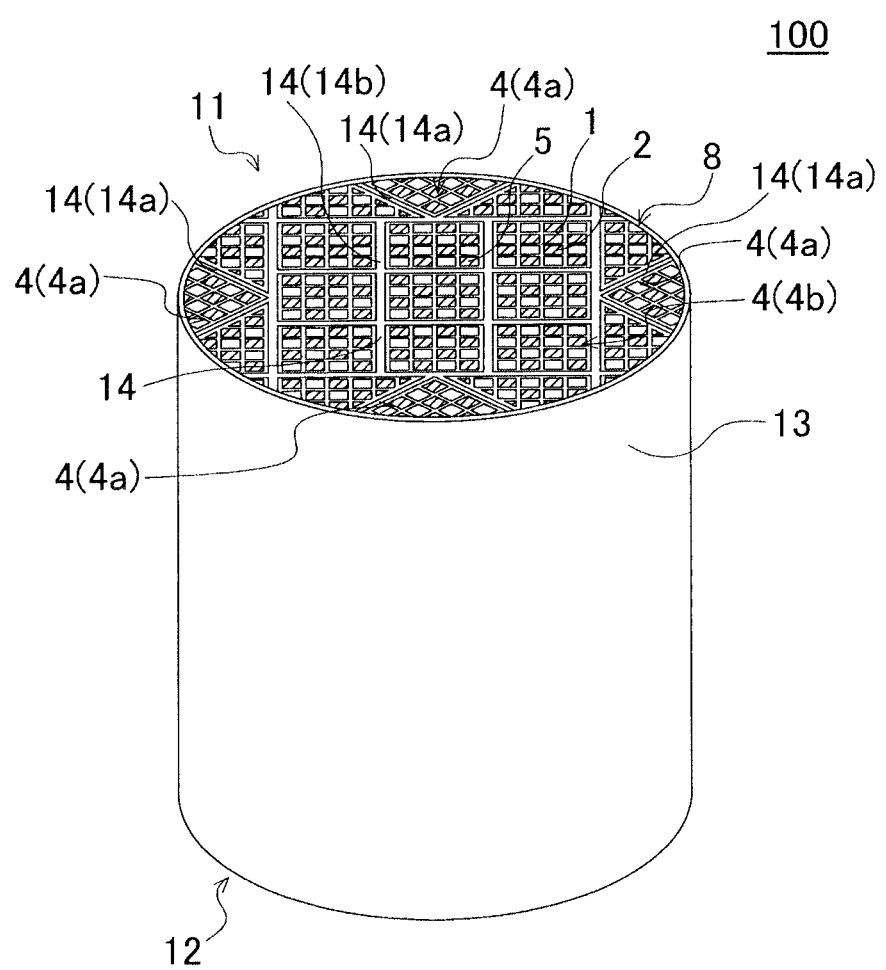
FIG. 1 is a perspective view schematically showing one embodiment of a honeycomb structure according to the present invention.
Figure 2:
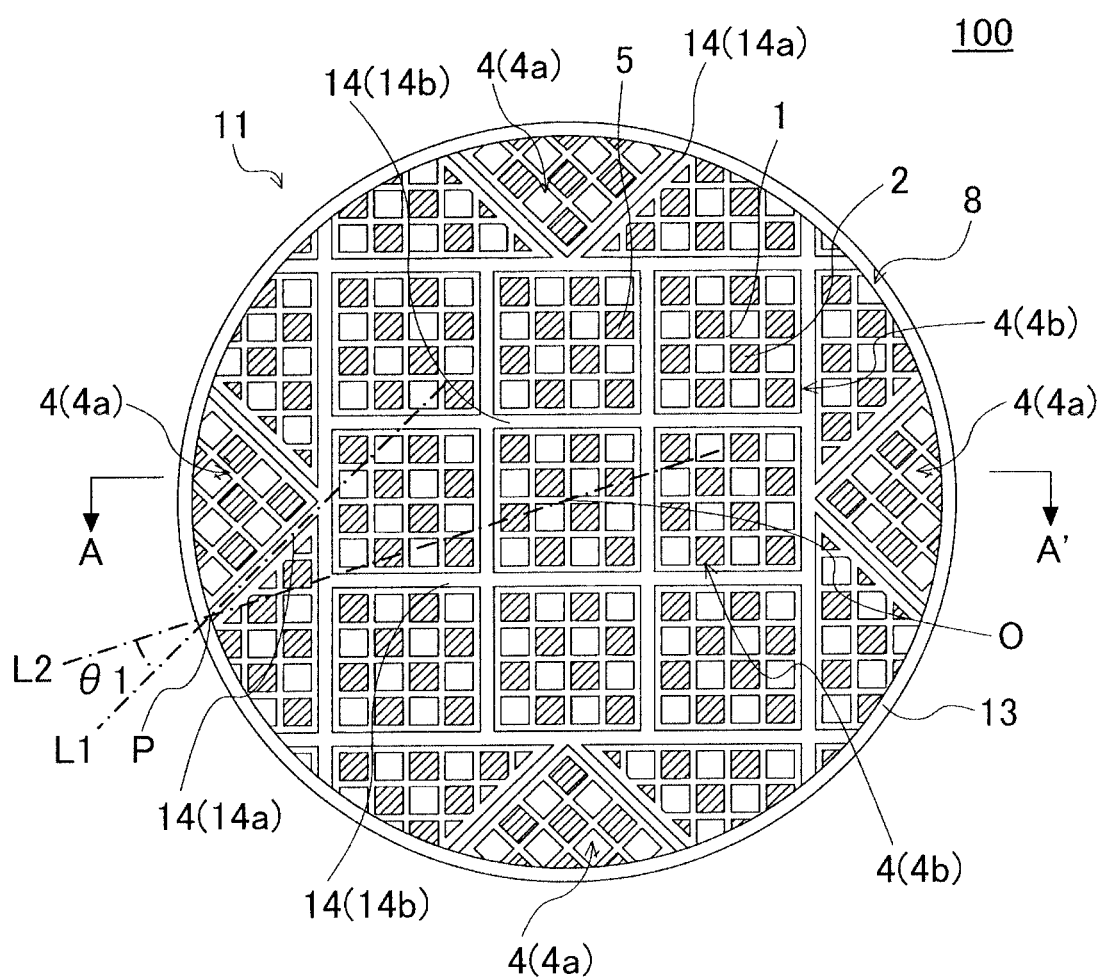
FIG. 2 is a plan view showing an inflow end face of the honeycomb structure shown in FIG. 1.
Figure 3:
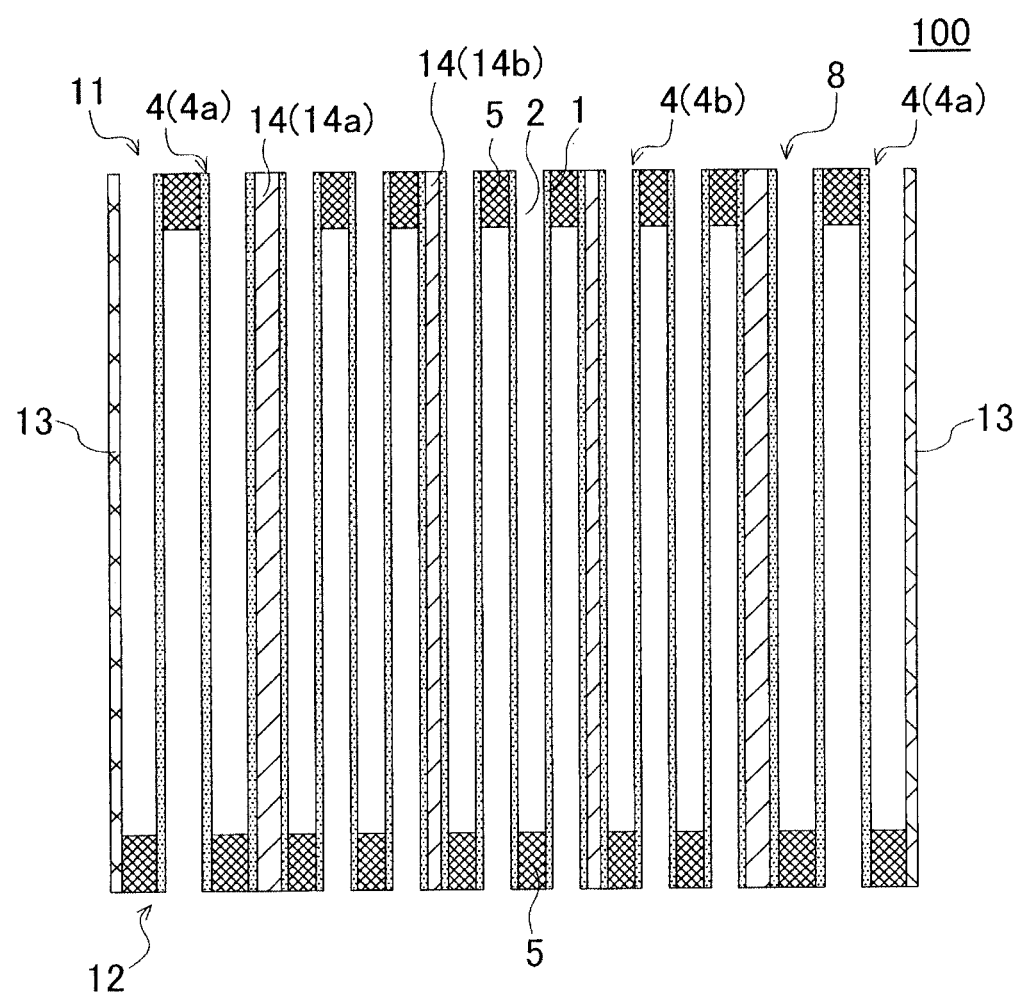
FIG. 3 is a cross-sectional view schematically showing a cross section viewed from the A-A' line in FIG. 2.

One embodiment of a honeycomb structure according to the present invention is a honeycomb structure 100 that includes a plurality of honeycomb segments 4, bonding layers 14, and a circumferential wall 13 as shown in FIGS. 1 to 3. The honeycomb structure 100 according to the present embodiment is the so-called segmented-structure honeycomb structure 100. The honeycomb structure 100 according to the present embodiment can be preferably used as a trapping filter for removing particulate matter contained in exhaust gas.

Herein, FIG. 1 is a perspective view schematically showing one embodiment of the honeycomb structure according to the present invention. FIG. 2 is a plan view showing an inflow end face of the honeycomb structure shown in FIG. 1. FIG. 3 is a cross-sectional view schematically showing a cross section viewed from the A-A' line in FIG. 2.

Each of the honeycomb segments 4 includes porous partition walls 1 disposed to surround a plurality of cells 2 that extends from an inflow end face 11 up to an outflow end face 12. Each of the honeycomb segments 4 is configured to further include a segmented outer wall on the circumferential portion of the partition walls 1 so that its overall shape becomes prismatic columnar for example. In addition, in the present invention, each of the cells 2 means a space that is surrounded by the partition walls 1.

The honeycomb structure 100 includes the plurality of honeycomb segments 4 and the side faces of the plurality of honeycomb segments 4 are bonded via the bonding layers 14.

The bonding layers 14 are formed by a bonding material which bonds the side faces of the plurality of honeycomb segments 4 each other. Hereinafter, a bonded body in which the plurality of honeycomb segments 4 is bonded via the bonding layers 14 may be called a "honeycomb segment bonded body 8". In the honeycomb structure 100 according to the present embodiment, the honeycomb segment bonded body 8 is formed by bonding the plurality of honeycomb segments 4 with the bonding layers 14 to be arranged in a grid pattern. The circumferential wall 13 is disposed to surround the outer circumference of the honeycomb segment bonded body 8.

In the honeycomb structure 100 according to the present embodiment, among the plurality of honeycomb segments 4, honeycomb segments 4 arranged on the outermost circumference of the honeycomb segment bonded body 8 are called "outermost segments 4a". Moreover, among the plurality of honeycomb segments 4, honeycomb segments 4 other than the outermost segments 4a are called "central segments 4b". The central segments 4b have a "prismatic columnar shape" of which an axial direction is a direction from the inflow end face 11 to the outflow end face 12. On the other hand, the outermost segments 4a are pillar-shaped segments that are obtained by grinding some of the honeycomb segments 4 formed in the prismatic columnar shape along the shape of the circumferential wall 13. Hereinafter, in the present specification, unless otherwise specified, the "axial direction" means a direction parallel to the direction from the inflow end face 11 toward the outflow end face 12 of the honeycomb segments 4.

The bonding layers 14 include circumferential bonding layers 14a and central bonding layers 14b as described below. The circumferential bonding layers 14a are bonding layers 14 for bonding the outermost segments 4a. The central bonding layers 14b are bonding layers 14 for bonding the central segments 4b.

In each of the cells 2 in each of the honeycomb segments 4, the end of one of the inflow end face 11 and the outflow end face 12 is plugged by a plugging portion 5. In other words, in each of the honeycomb segments 4, the plugging portions 5 are disposed in open ends of the predetermined cells 2 in the inflow end face 11 and in open ends of the residual cells 2 other than the predetermined cells 2 in the outflow end face 12.

Hereinafter, the cells 2 (i.e., the predetermined cells 2 described above) for which the plugging portions 5 are disposed in their open ends in the inflow end face 11 of each of the honeycomb segments 4 may be called "outflow cells". The cells 2 (i.e., the residual cells 2 described above) for which the plugging portions 5 are disposed in their open ends in the outflow end face 12 of each of the honeycomb segments 4 may be called "inflow cells".

The honeycomb structure 100 has a main feature with respect to the configuration of the outermost segments 4a and the circumferential bonding layers 14a. In other words, as shown in FIG. 2, the honeycomb structure 100 is configured so that the size of an angle $\theta 1$ between a first direction L1 and a second direction L2 is 25 to 45°. Herein, the "first direction L1" indicates a direction of extension of at least one of the circumferential bonding layers 14a in the inflow end face 11 of the honeycomb segment bonded body 8. The "second direction L2" indicates a direction of extension of a line segment OP. The "line segment OP" is a line segment connecting a centroid O of the honeycomb segment bonded body 8 and an intersection point P at which the circumferential bonding layer 14a in the first direction L1 intersects with the circumferential wall 13. Herein, the "centroid O" of the honeycomb segment bonded body 8 indicates the centroid of the inflow end face 11 of the honeycomb segment bonded body 8 in the geometric sense. The angle $\theta 1$ between the first direction L1 and the second direction L2 indicates an acute angle among angles $\theta 1$ to be formed by these directions. In addition, the intersection point P at which the circumferential bonding layer 14a intersects with the circumferential wall 13 indicates a point at which "the center line of a width" of the circumferential bonding layer 14a and "the center line of a thickness" of the circumferential wall 13 intersect. In this case, the outermost segment 4a, which is bonded by the circumferential bonding layer 14a having the size of the angle $\theta$ of 25 to 45°, exists on a parallel line to the direction of extension of the central bonding layer 14b passing through the centroid O of the honeycomb segment bonded body 8 in the inflow end face 11 of the honeycomb segment bonded body 8.

The honeycomb structure 100 according to the present embodiment can effectively suppress the occurrence of a crack occurring in the bonding layer 14. In other words, the honeycomb structure 100 according to the present embodiment is configured so that the circumferential bonding layer 14a that bonds the outermost segment 4a is located to have the size of the angle $\theta 1$ of 25 to 45° between the first direction L1 and the second direction L2. Because the circumferential bonding layer 14a is arranged to avoid a radiation direction in which the crack is easy to occur in the bonding layer 14, it is possible to effectively suppress the occurrence of the crack occurring in the bonding layer 14 (i.e., the circumferential bonding layer 14a) of the circumferential portions of the honeycomb segment bonded body 8. Moreover, the extension of a crack to the whole of the bonding layer 14 can be effectively prevented by suppressing the occurrence of the crack occurring in the circumferential bonding layer 14a.

When the size of the angle $\theta 1$ is less than 25°, the circumferential bonding layer 14a becomes closer to the radiation direction and thus the effect suppressing the occurrence of the crack is not sufficiently obtained. The angle $\theta 1$ indicates an acute angle and thus its substantial upper limit is 45°. The size of the angle $\theta 1$ is preferably 30 to 45° and is further preferably 40 to 45°. By employing such the configuration, it is possible to more effectively suppress the occurrence of the crack.

In the inflow end face 11 of the honeycomb segment bonded body 8, it is only sufficient that the number of the circumferential bonding layers 14a having the size of the angle $\theta 1$ of 25 to 45° is at least one. In the honeycomb structure 100 according to the present embodiment, as shown in FIG. 2, among the outermost segments 4a, the circumferential bonding layers 14a having the size of the angle $\theta 1$ of 25 to 45° are present at total 8 places on the extended lines extending in the vertical and horizontal radial directions of a paper space around the centroid O of the honeycomb segment bonded body 8. For example, the honeycomb structure 100 according to the present embodiment employs, as four outermost segments 4a among the outermost segments 4a on the extended lines extending in the vertical and horizontal radial directions of the paper space around the centroid O of the honeycomb segment bonded body 8, the honeycomb segments 4 whose shape is different from that of the central segments 4b. These four outermost segments 4a have a shape that is obtained by rotating the shape of the central segments 4b having a quadrangle in the inflow end face 11 by 45° clockwise. For this reason, the circumferential bonding layers 14a that bond the outermost segments 4a having the shape as rotated 45° in the inflow end face 11 have the size of the angle $\theta 1$ of 25 to 45°. Hereinafter, "the circumferential bonding layers 14a having the size of the angle $\theta 1$ of 25 to 45°" may be called "the specific circumferential bonding layers 14a".

The outermost segments 4a that are bonded by the specific circumferential bonding layers 14a exist on "the parallel line to the direction of extension of the central bonding layer 14b" passing through the centroid O of the honeycomb segment bonded body 8 in the inflow end face 11 of the honeycomb segment bonded body 8. By employing such the configuration, the suppression effect of crack occurrence of the specific circumferential bonding layers 14a becomes more remarkable with respect to the radiation direction in which the crack is easy to occur in the bonding layers 14.

In the inflow end face 11 of the honeycomb segment bonded body 8, the number of the specific circumferential bonding layers 14a is preferably 2 to 8 and is more preferably 4 to 8. Particularly, the suppression effect of crack occurrence of the specific circumferential bonding layers 14a becomes more remarkable by respectively positioning the specific circumferential bonding layers 14a in the four directions of the left, right, top and bottom in which the central bonding layers 14b extends from the centroid O of the honeycomb segment bonded body 8.

In the inflow end face 11 of the honeycomb segment bonded body 8, it is preferable that the shape of the central segments 4b is a quadrangle and it is more preferable that the shape is a square. Moreover, in the inflow end face 11 of the honeycomb segment bonded body 8, it is preferable that the plurality of central segments 4b is bonded with the central bonding layers 14b in the state where these central segments are arrayed in a square grid pattern.

Figure 4:
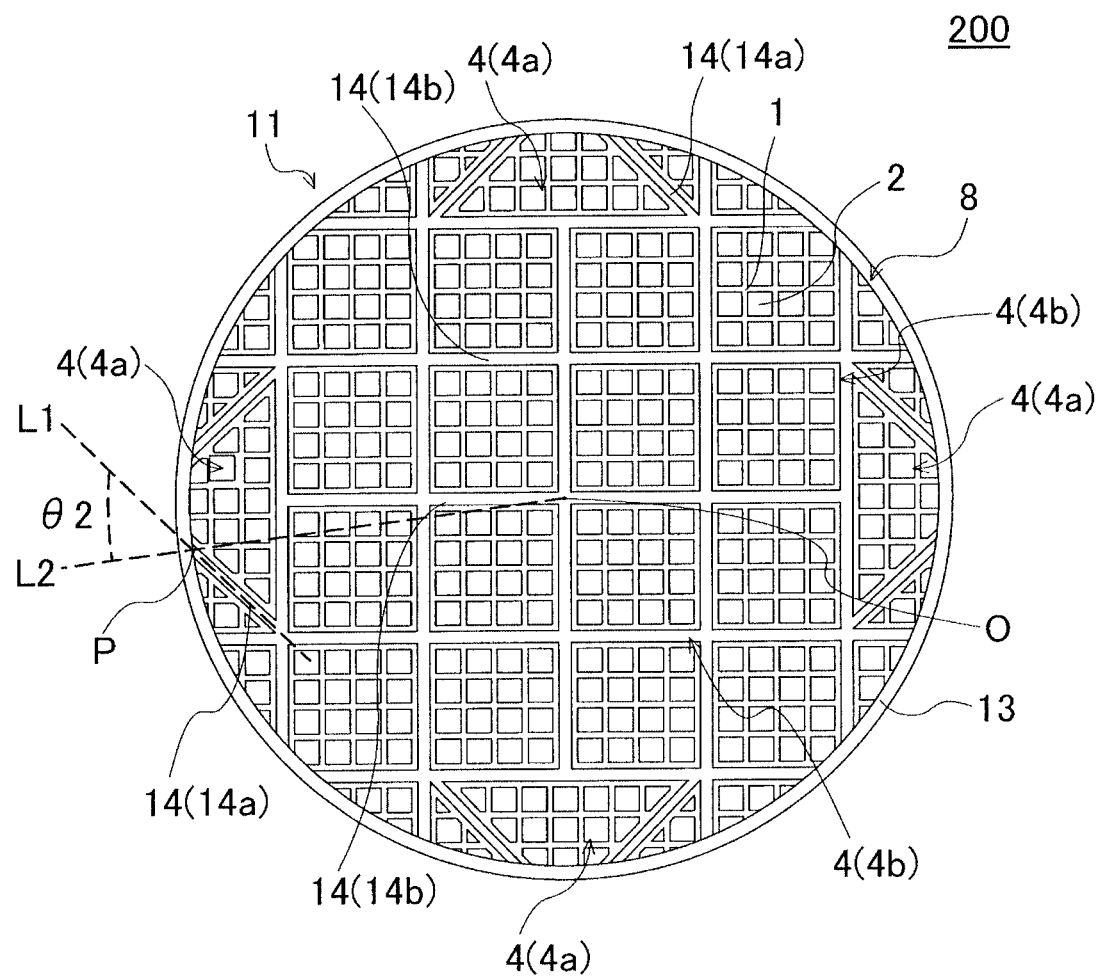
FIG. 4 is a plan view schematically showing another embodiment of a honeycomb structure according to the present invention.
Figure 5:
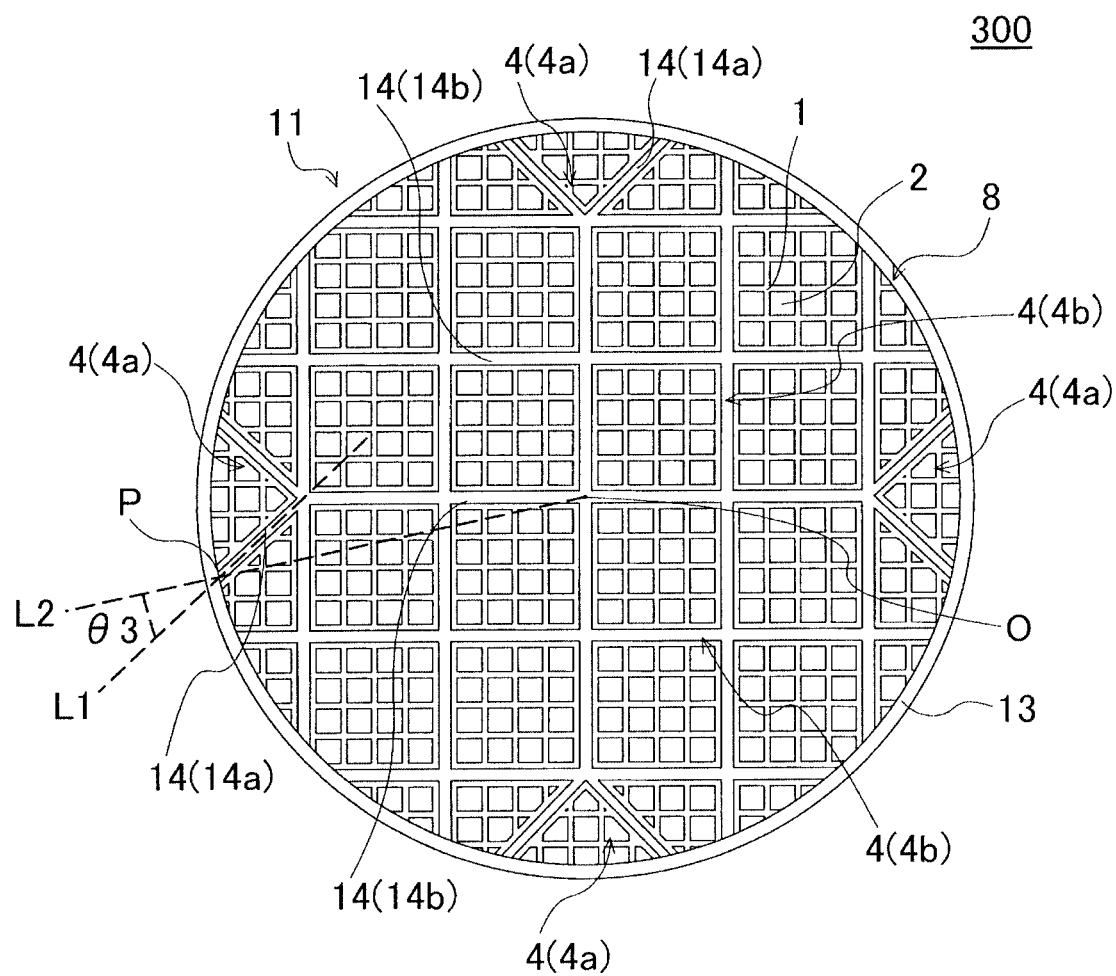
FIG. 5 is a plan view schematically showing further another embodiment of a honeycomb structure according to the present invention.
Figure 6:
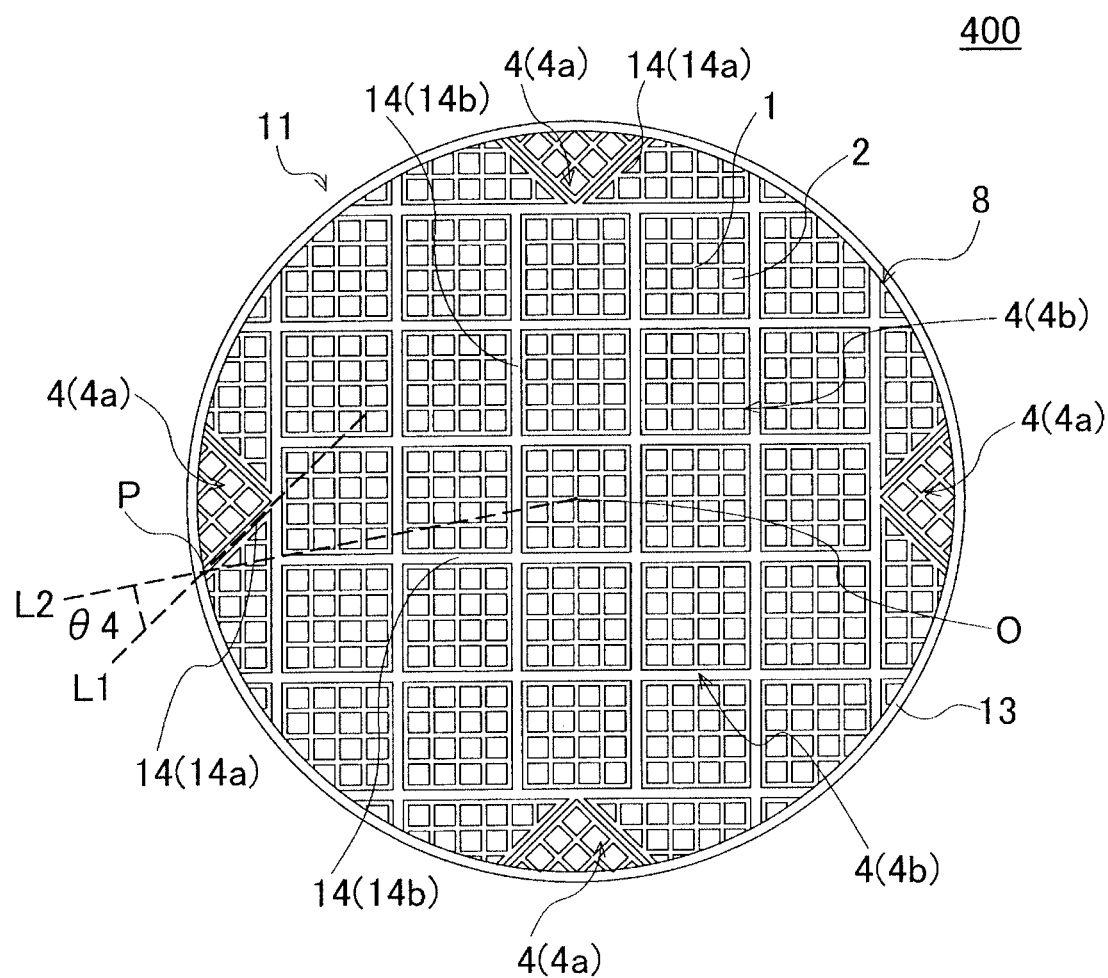
FIG. 6 is a plan view schematically showing further another embodiment of a honeycomb structure according to the present invention.

In the inflow end face 11 of the honeycomb segment bonded body 8, the shape of the outermost segments 4a has no particular limitation. This shape only needs to be a circumferential shape in which the size of the angle θ1 formed by the specific circumferential bonding layer 14a is 25 to 45°. For example, as described above, the shape of the outermost segments 4a can include a shape that is obtained by rotating the shape of the quadrangular central segment 4b by 450 clockwise. Herein, another embodiment and further another embodiment of a honeycomb structure according to the present invention will be explained with reference to FIGS. 4 to 6. FIG. 4 is a plan view schematically showing another embodiment of a honeycomb structure according to the present invention. FIGS. 5 and 6 are plan views schematically showing further another embodiment of a honeycomb structure according to the present invention. In addition, FIGS. 4 to 6 show a state where the plugging portions 5 (see FIG. 2) for plugging the open ends of the cells 2 of each of the honeycomb segments 4 are abstracted. In honeycomb structures 200, 300, and 400 shown in FIGS. 4 to 6, the same components as those of the honeycomb structure 100 shown in FIGS. 1 to 3 have the same reference numbers and their descriptions are omitted.

The honeycomb structure 200 shown in FIG. 4 is obtained by bonding up to the six honeycomb segments 4 with the bonding layers 14 in the vertical and horizontal directions of the paper space around the centroid O of the honeycomb segment bonded body 8. In the honeycomb segments 4 bonded by the bonding layers 14, their circumferential portions are ground in a circular shape and the circumferential wall 13 is disposed to surround the grounded honeycomb segments 4. In the honeycomb structure 200 shown in FIG. 4, the outermost segments 4a that are bonded by the specific circumferential bonding layers 14a have a shape conforming to a trapezoid, and each of the outermost segments is arranged so that the base (i.e., bottom) of this trapezoid faces the centroid O of the honeycomb segment bonded body 8. Moreover, the honeycomb structure 200 is configured so that the size of an angle θ2 between the first direction L1 and the second direction L2 is 25 to 45°. In other words, the circumferential bonding layers 14a that bond the oblique sides of the outermost segments 4a having a shape conforming to a trapezoid correspond to the specific circumferential bonding layers 14a. Herein, the reason using the description of "a shape conforming to a trapezoid" is that the upper base side of the trapezoid has an arc shape corresponding to the circumferential shape of the honeycomb segment bonded body 8. For example, the shape conforming to this trapezoid may indicate a shape in which the vertex portion of an isosceles triangle such as a right-angled triangle has an arc shape corresponding to the circumferential shape of the honeycomb segment bonded body 8.

The honeycomb structure 300 shown in FIG. 5 is obtained by bonding up to the six honeycomb segments 4 with the bonding layers 14 in the vertical and horizontal directions of the paper space around the centroid O of the honeycomb segment bonded body 8. In the honeycomb segments 4 bonded by the bonding layers 14, their circumferential portions are ground in a circular shape and the circumferential wall 13 is disposed to surround the grounded honeycomb segments 4. In the honeycomb structure 300 shown in FIG. 5, the number of the honeycomb segments 4 that constitute the honeycomb segment bonded body 8 is increased by one in each of the vertical and horizontal directions of the paper space, as compared to the honeycomb structure 100 shown in FIG. 2. Moreover, the honeycomb structure 300 is configured so that the size of an angle θ3 between the first direction L1 and the second direction L2 is 25 to 45°.

The honeycomb structure 400 shown in FIG. 6 is obtained by bonding up to the seven honeycomb segments 4 with the bonding layers 14 in the vertical and horizontal directions of the paper space around the centroid O of the honeycomb segment bonded body 8. In the honeycomb segments 4 bonded by the bonding layers 14, their circumferential portions are ground in a circular shape and the circumferential wall 13 is disposed to surround the grounded honeycomb segments 4. In the honeycomb structure 400 shown in FIG. 6, the number of the honeycomb segments 4 that constitute the honeycomb segment bonded body 8 is increased by two in each of the vertical and horizontal directions of the paper space, as compared to the honeycomb structure 100 shown in FIG. 2. Moreover, the honeycomb structure 400 is configured so that the size of an angle θ4 between the first direction L1 and the second direction L2 is 25 to 45°.

The width of each of the bonding layers 14 in the inflow end face 11 or the outflow end face 12 of the honeycomb structure 100 is preferably 0.3 to 3.0 mm, is further preferably 0.5 to 2.0 mm, and is particularly preferably 0.5 to 1.5 mm. When the width of each of the bonding layers 14 is less than 0.3 mm, this is not preferable in that the bond strength of the honeycomb structure 100 is easy to be decreased. When the width of each of the bonding layers 14 exceeds 3.0 mm, this is not preferable in that the pressure loss of the honeycomb structure 100 is increased.

The material of the bonding layers 14 has no particular limitation and thus can use the material of bonding layers in the conventionally known honeycomb structure.

The shape of the cell 2 formed in the honeycomb segment 4 has no particular limitation. For example, the shape of the cell 2 in a cross section orthogonal to the direction of extension of the cell 2 can include a polygon, a circular shape, an elliptical shape, and the like. A polygon can include a triangle, a quadrangle, a pentagon, a hexagon, an octagon, and the like. In addition, it is preferable that the shape of the cell 2 is a triangle, a quadrangle, a pentagon, a hexagon, and/or an octagon. Moreover, in terms of the shape of the cell 2, the shapes of all the cells 2 may be the same or may be different from each other. For example, although it is not shown, quadrangular cells and octagonal cells may be mixed. Moreover, in terms of the size of the cell 2, the sizes of all the cells 2 may be the same or may be different from each other. For example, although it is not shown, among the plurality of cells, the size of some cells may be made larger and the size of other cells may be made relatively smaller.

A cell density of the cells 2 sectioned by the partition walls 1 is preferably 15 to 90 cells/cm$^2$ and is further preferably 30 to 60 cells/cm$^2$. By employing such the configuration, the honeycomb structure 100 according to the present embodiment can be preferably used as a filter for purifying exhaust gas emitted from the engine of the automobile.

The porosity of the partition walls 1 is preferably 30 to 80%, is further preferably 35 to 75%, and is particularly preferably 40 to 70%. The porosity of the partition walls 1 is a value measured by a mercury press-in method. The measurement of the porosity of the partition walls 1 can be performed by using Autopore 9500 (product name) made by Micromeritics for example. After cutting off a portion of the partition walls 1 of each of the honeycomb segments 4 to take a test piece, the measurement of the porosity can be performed by using this test piece. When the porosity of the partition walls 1 is less than 30%, the pressure loss of the honeycomb structure 100 itself may be increased and the deviation of the pressure loss after the load of a catalyst may be increased. When the porosity of the partition walls 1 exceeds 80%, strength and trapping performance of the honeycomb structure 100 as a filter may be decreased.

The shape of the honeycomb segments 4 has no particular limitation. In this regard, however, in terms of the shape of the central segments 4b, it is preferable that the cross-sectional shape orthogonal to the axial direction of the central segments 4b is a quadrangular prismatic columnar shape. The shape of the outermost segments 4a may be a shape in which a portion of a prismatic column is processed by grinding etc. in accordance with the entire shape of the honeycomb structure 100, and an unprocessed shape can include a triangle, a quadrangle, etc., for example.

The entire shape of the honeycomb structure 100 has no particular limitation. For example, the entire shape of the honeycomb structure 100 shown in FIG. 1 is a round pillar shape in which the inflow end face 11 and the outflow end face 12 have a circular shape. Alternatively, although it is not shown, the entire shape of the honeycomb structure may be a pillar shape in which the inflow end face and the outflow end face have a substantially circular shape such as an elliptical shape, a racetrack shape, and an oval shape. Moreover, the entire shape of the honeycomb structure may be a prismatic columnar shape in which the inflow end face and the outflow end face have a shape of a polygon such as a quadrangle and a hexagon.

The materials that constitute the honeycomb segments 4 have no particular limitation, but at least one material selected from the following material group is preferable from the viewpoint of strength, heat resistance, durability, etc. The material group is a group of silicon carbide, silicon-silicon carbide based composite material, silicon nitride, cordierite, mullite, alumina, spinel, silicon carbide-cordierite based composite material, lithium aluminum silicate, aluminum titanate, and Fe—Cr—Al based metal. Among these, silicon carbide or silicon-silicon carbide based composite material is further preferable. The silicon-silicon carbide based composite material is a composite material in which silicon carbide (SiC) is aggregates and silicon (Si) is bonding materials.

The material of the plugging portion 5 has no particular limitation. For example, it is preferable that the material of the plugging portion 5 is similar to the materials illustrated as the materials that constitute the honeycomb segment 4.

The size of the honeycomb structure 100, for example, a length from the inflow end face 11 to the outflow end face 12 and the size of a cross section orthogonal to the direction of extension of the cell 2 of the honeycomb structure 100 have no particular limitation. When the honeycomb structure 100 according to the present embodiment is used as a filter for the purification of exhaust gas, it is sufficient to appropriately select each size to obtain optimum purification performance. For example, a length from the inflow end face 11 to the outflow end face 12 of the honeycomb structure 100 is preferably 150 to 305 mm and is particularly preferably 150 to 200 mm. Moreover, an area of a cross section orthogonal to the direction of extension of the cell 2 of the honeycomb structure 100 is preferably 144 to 330 mm$^2$ and is particularly preferably 144 to 178 mm$^2$.

In the honeycomb structure 100 according to the present embodiment, the plugging portions 5 are arranged in open ends of the predetermined cells 2 in the inflow end face 11 and in open ends of the residual cells in the outflow end face 12. Herein, the cells 2 in which the plugging portions 5 are arranged in their open ends in the outflow end face 12 and their open ends in the inflow end face 11 are opened are called inflow cells. Moreover, the cells 2 in which the plugging portions 5 are arranged in their open ends in the inflow end face 11 and their open ends in the outflow end face 12 are opened are called outflow cells. It is preferable that the inflow cells and the outflow cells are alternately arranged with the partition wall 1 therebetween. Thereby, it is preferable that a checkered pattern is formed in both end faces of the honeycomb structure 100 by the plugging portions 5 and the "open ends of the cells 2".

In the honeycomb structure 100 according to the present embodiment, a catalyst may be loaded onto the partition walls 1 that forms the plurality of cells 2. To load a catalyst onto the partition walls 1 means that a catalyst is coated on the surfaces of the partition walls 1 and the inner walls of pores formed in the partition walls. By employing such the configuration, CO, NOx, HC, etc. in the exhaust gas can be converted into harmless substances by a catalytic reaction. Moreover, it is possible to promote the oxidation of PM such as the trapped soot.

(2) Method of Manufacturing Honeycomb Structure

A method of manufacturing the honeycomb structure according to the embodiment has no particular limitation. For example, the honeycomb structure can be manufactured by the following method. First, plastic kneaded material to make the honeycomb segment is prepared. The kneaded material to make the honeycomb segment can be prepared as raw material powder by appropriately adding water and an addition agent such as binder to a material selected from among preferable materials of the honeycomb segment described above.

Next, a prismatic columnar honeycomb formed body including a partition walls disposed to surround the plurality of cells and a segmented outer wall disposed on the outermost circumference is made by performing extrusion on the kneaded material obtained in this way. A plurality of the honeycomb formed bodies is made. In addition, when the shapes of the outermost segment and the central segment are different from each other, honeycomb formed bodies having desired shapes are made by the respective required numbers.

Plugging portions are made by drying the obtained honeycomb formed bodies by using a microwave and hot air and plugging the open ends of the cells with the same material as the material used for making the honeycomb formed bodies, for example. The honeycomb formed bodies may be further dried after making the plugging portions.

Next, the honeycomb segments are obtained by firing the honeycomb formed bodies in which the plugging portions are made. A firing temperature and a firing environment are different depending on raw materials. Those skilled in the art can select a firing temperature and a firing environment most suitable for the selected material.

Next, a segmented-structure honeycomb structure can be obtained by bonding the plurality of honeycomb segments by using a bonding material with respect to each other and drying and curing the segments and then processing the outer circumference to have a desired shape. The bonding material can use a material obtained by adding a liquid medium such as water to a ceramic material to make a paste state or a slurry state.

When manufacturing the honeycomb structure according to the present invention, in the honeycomb segment bonded body in which the plurality of honeycomb segments is bonded, the size of the angle θ between the first direction L1 and the second direction L2 is set to be 25 to 45° by adjusting the shape and arrangement of the outermost segments.

Because a processed surface after the outer circumference of the honeycomb segment bonded body is processed has cells that are exposed, a circumferential wall may be formed by applying an outer coating material onto the processed surface of the honeycomb segment bonded body. The outer coating material can include a slurry state obtained by adding water and an addition agent such as organic binder, foamable resin, and dispersing agent to inorganic raw material such as inorganic fiber, colloidal silica, clay, and ceramic particles and kneading these, for example.

EXAMPLES

Hereinafter, the present invention will be more specifically explained by using Examples, but the present invention is not limited to these Examples.

Example 1

A mixed raw material obtained by mixing silicon carbide (SiC) powder and metallic silicon (Si) powder at a mass ratio of 80:20 was prepared as a ceramic raw material. A forming raw material was made by adding "hydroxypropyl methylcellulose as binder, water absorbable resin as pore former, and water" to the mixed raw material. The obtained forming raw material was kneaded by a kneader to obtain kneaded material.

Next, 13 square prismatic columnar honeycomb formed bodies and 12 triangular prismatic columnar honeycomb formed bodies were made by molding the obtained kneaded material by using a vacuum extruder. The 9 square prismatic columnar honeycomb formed bodies become the central segments, and the 4 square prismatic columnar honeycomb formed bodies and the 12 triangular prismatic columnar honeycomb formed bodies become the outermost segments.

Next, the obtained honeycomb formed bodies were dried by high frequency dielectric heating and then were dried at 120° C. for 2 hours by using a hot-air drying machine.

Next, plugging portions were formed in each of the honeycomb formed bodies after drying. More specifically, masking was first performed on the inflow end face of the honeycomb formed body after drying. Next, the masked end (end of inflow end face) was dipped in plugging slurry and the open ends of the unmasked cells (outflow cells) were filled up with the plugging slurry. In this way, the plugging portions were formed in the inflow end face of the honeycomb formed body after drying. Similarly, in case of the outflow end face of the honeycomb formed body after drying, plugging portions were formed in the inflow cells.

Then, the honeycomb formed body in which the plugging portions are formed was degreased and fired to obtain the honeycomb segment. The condition of the degreasing was 550° C. and 3 hours, and the condition of the firing was 1,450° C. and 2 hours under an argon atmosphere.

As described above, the honeycomb segments used for manufacturing a honeycomb structure according to Example 1 were made. In each of the square prismatic columnar honeycomb segments, a cross section perpendicular to the axial direction had a square and the length (segment size) of one side of the square was 39 mm. The triangular prismatic columnar honeycomb segments having a right-angled triangle as a cross section perpendicular to the axial direction included 8 honeycomb segments in which the length of the oblique side of the right-angled triangle is 59 mm and 4 honeycomb segments in which the length of the oblique side of the right-angled triangle is 83 mm. The length of one side of the end face of each of the square prismatic columnar honeycomb segments is indicated in the column of "Length (mm) of one side" of "Honeycomb segment" in Table 1. Moreover, in each of the honeycomb segments, the length of the axial direction was 178 mm.

In each of the honeycomb segments, the thickness of the partition walls was 0.3 mm and its cell density was 46 cells/cm$^2$. Moreover, the porosity of the partition walls was 41%. The porosity of the partition walls was measured by Autopore 9500 (product name) made by Micromeritics.

Next, a bonding material for bonding the honeycomb segments was prepared. As the bonding material, used was a slurry-state material obtained by adding "organic binder, foamable resin, and a dispersing agent" as an addition agent and further water to inorganic raw materials constituting the bonding layers and kneading these.

Next, a honeycomb segment bonded body was made by bonding the obtained honeycomb segments with the bonding material in the state where these honeycomb segments are adjacently arranged so that their side faces face each other and performing a heat treatment on these segments at 700° C.

As shown in FIG. 2, the honeycomb segment bonded body was made by bonding the total 25 honeycomb segments in which 5 segments in the vertical direction and 5 segments in the horizontal direction are arranged in its end face. The columns of "Number (pcs)" and "Arrangement (pcs×pcs)" in "Honeycomb segments" of Table 1 show the number and the arrangement of the honeycomb segments that are used in Examples. For example, when "5×5" is described in the column of "Arrangement (pcs×pcs)", the description means that the 5 honeycomb segments 4 in the vertical direction and the 5 honeycomb segments 4 in the horizontal direction are arranged, as shown in FIG. 2.

Next, the honeycomb structure according to Example 1 was obtained by grinding the outer circumference of the honeycomb segment bonded body in the shape of a round pillar and applying a coating material onto its outer circumferential surface. In the honeycomb structure according to Example 1, the diameter of the end face was 191 mm and the length of the axial direction was 178 mm. Moreover, in the honeycomb structure according to Example 1, the width of each of the bonding layers was 1.0 mm. Their results are shown in Table 1.

In the honeycomb structure according to Example 1, the size of the angle θ1 between the first direction L1 and the second direction L2 as shown in FIG. 2 was 30°. The column of "Angle θ (°) between first direction L1 and second direction L2" in Table 1 shows the size of "the angle θ between the first direction L1 and the second direction L2" of the honeycomb structure according to Example 1. Moreover, the column of "Reference diagram" in Table 1 shows a drawing referring to the configuration of the outermost segments and the circumferential bonding layers of the honeycomb structure according to Example 1.

A "rapid cooling test (electric furnace spalling test: E-sp evaluation)" was performed on the honeycomb structure according to Example 1 in the following method. The results are shown in Table 2.

Rapid Cooling Test (Electric Furnace Spalling Test: E-Sp Evaluation)

The honeycomb structure was brought to a uniform temperature by putting the honeycomb structure in an electric furnace whose internal temperature is 200° C. and heating it for 2 hours. After that, the heated honeycomb structure was taken out from the electric furnace to be rapidly cooled up to a room temperature. The confirmation of whether a crack occurs in the circumferential wall was performed on the honeycomb structure after rapid cooling. When the crack does not occur in the circumferential wall, the above heating and rapid cooling were repeatedly performed until a crack occurs in the circumferential wall by raising the temperature in the furnace in unit of 25° C. A furnace temperature that is 25° C. lower than the furnace temperature at which the crack occurs in the circumferential wall was taken as a measured value in the rapid cooling test. In the rapid cooling test, the pass/fail determination was performed based on the following evaluation criterion. The results are shown in the column of "Determination" in Table 2. As compared to the honeycomb structures of Comparative Examples in which the values in the column of "Arrangement (pcs×pcs)" in Table 1 are the same as those of Examples, cases showing that the measured values in the rapid cooling test are higher were determined as "Pass" and cases showing that the measured values in the rapid cooling test are lower were determined as "Fail".

Examples 2 to 4

Honeycomb structures were manufactured in the same manner as in Example 1 except for the case where the configurations of the honeycomb structures are changed as shown in Table 1. As shown in FIG. 4, a honeycomb structure according to Example 2 was made by bonding the total 36 honeycomb segments 4 so that 6 segments in the vertical direction and 6 segments in the horizontal direction are arrayed. As shown in FIG. 5, a honeycomb structure according to Example 3 was made by bonding the total 36 honeycomb segments 4 so that 6 segments in the vertical direction and 6 segments in the horizontal direction are arrayed. As shown in FIG. 6, a honeycomb structure according to Example 4 was made by bonding the total 49 honeycomb segments 4 so that 7 segments in the vertical direction and 7 segments in the horizontal direction are arrayed. In addition, the length of one side of each of the square prismatic columnar honeycomb segments in Examples 2 to 4 is as indicated in Table 1. Moreover, in Examples 2 and 3, the triangular prismatic columnar honeycomb segments had a right-angled triangle as the shape of a cross section perpendicular to the axial direction, and included 8 segments in which the length of the oblique side of the right-angled triangle is 39 mm and 4 segments in which the length of the oblique side of the right-angled triangle is 55 mm. In Example 4, the triangular prismatic columnar honeycomb segments had a right-angled triangle as the shape of a cross section perpendicular to the axial direction, and included 8 segments in which the length of the oblique side of the right-angled triangle is 55 mm and 4

TABLE 1

Figure 7:
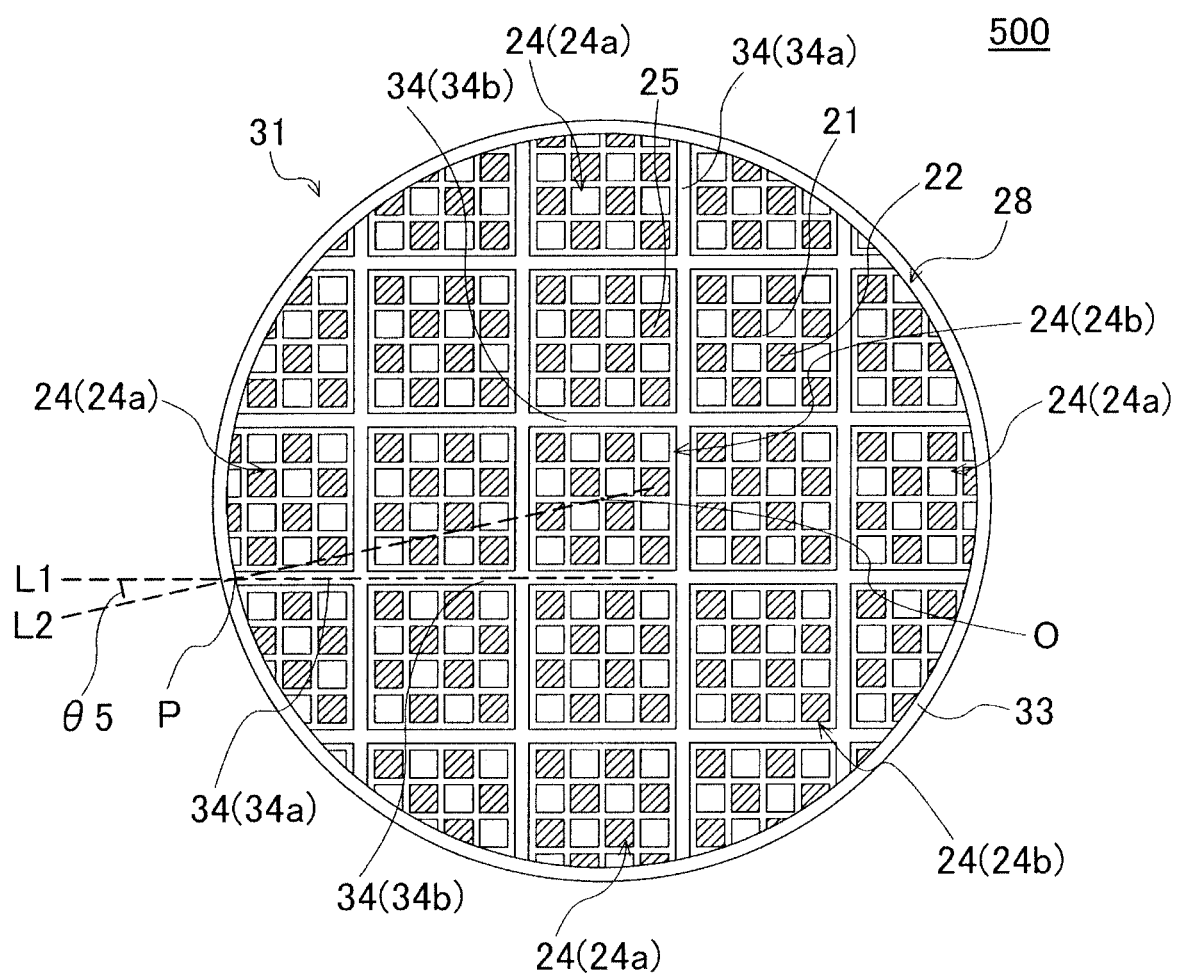
FIG. 7 is a plan view schematically showing a honeycomb structure according to Comparative Example 1.

| | Honeycomb structure | | | | | | | |
|---|---|---|---|---|---|---|---|---|
| | Diameter (mm) | Axial-direction length (mm) | Honeycomb segments | | | Bonding layer Width (mm) | Angle q (°) between first direction L1 and second direction L2 | Reference diagram |
| | | | One-side length (mm) | Number (pcs) | Arrangement (pcs × pcs) | | | |
| Example 1 | 191 | 178 | 39 | 25 | 5 × 5 | 1.0 | 30 | FIG. 2 |
| Example 2 | 229 | 203 | 39 | 36 | 6 × 6 | 1.0 | 40 | FIG. 4 |
| Example 3 | 229 | 203 | 39 | 36 | 6 × 6 | 1.0 | 30 | FIG. 5 |
| Example 4 | 229 | 203 | 36 | 49 | 7 × 7 | 1.0 | 40 | FIG. 6 |
| Comparative Example 1 | 191 | 178 | 39 | 25 | 5 × 5 | 1.0 | 12 | FIG. 7 |
| Comparative Example 2 | 229 | 203 | 39 | 36 | 6 × 6 | 1.0 | 0.20 | — |
| Comparative Example 3 | 229 | 203 | 36 | 49 | 7 × 7 | 1.0 | 10 | — |

TABLE 2

| | Rapid cooling test (E-sp evaluation) (° C.) | Determination |
|---|---|---|
| Example 1 | 375 | Pass |
| Example 2 | 350 | Pass |
| Example 3 | 325 | Pass |
| Example 4 | 350 | Pass |
| Comparative Example 1 | 350 | — |
| Comparative Example 2 | 300 | — |
| Comparative Example 3 | 275 | — | segments in which the length of the oblique side of the right-angled triangle is 78 mm.

Comparative Examples 1 to 3

Honeycomb structures were manufactured in the same manner as in Example 1 except for the case where the configurations of the honeycomb structures are changed as indicated in Table 1. As shown in FIG. 7, a honeycomb structure according to Comparative Example 1 was made by bonding total 25 honeycomb segments 24 so that 5 segments in the vertical direction and 5 segments in the horizontal direction are arrayed. Herein, FIG. 7 is a plan view schematically showing a honeycomb structure according to Comparative Example 1. A honeycomb structure 500 shown in FIG. 7 is a honeycomb structure 500 that includes the plurality of honeycomb segments 24, bonding layers 34, and a circumferential wall 33. Each of the honeycomb segments 24 has porous partition walls 21 disposed to surround a plurality of cells 22. In Comparative Example 1, each of outermost segments 24a and central segments 24b employed the square prismatic columnar honeycomb segments 24 whose length of one side is 39 mm, and the honeycomb segments 24 were bonded via the bonding layers 34 in an inflow end face 31 of a honeycomb segment bonded body 28 to have a grid pattern. In Comparative Example 1, an angle θ5 between the first direction L1 and the second direction L2 was 12°. In FIG. 7, the reference number 25 shows plugging portions, the reference number 34a shows circumferential bonding layers, and the reference number 34b shows central bonding layers. In addition, although it is not shown, in a honeycomb structure according to Comparative Example 2, the number of the honeycomb segments 24 that constitute the honeycomb segment bonded body 28 is increased by one in each of the vertical and horizontal directions of the paper space with respect to the honeycomb structure 500 shown in FIG. 7. In a honeycomb structure according to Comparative Example 3, the number of the honeycomb segments 24 that constitute the honeycomb segment bonded body 28 is increased by two in each of the vertical and horizontal directions of the paper space with respect to the honeycomb structure 500 shown in FIG. 7.

A "rapid cooling test (electric furnace spalling test: E-sp evaluation)" was performed on the honeycomb structures of Examples 2 to 4 and Comparative Examples 1 to 3 in the same manner as in Example 1. The results are shown in Table 2.

(Result)

The honeycomb structure according to Example 1 had good results in the rapid cooling test as compared to the honeycomb structure of Comparative Example 1. The honeycomb structures according to Examples 2 and 3 had good results in the rapid cooling test as compared to the honeycomb structure of Comparative Example 2. The honeycomb structure according to Example 4 had good results in the rapid cooling test as compared to the honeycomb structure of Comparative Example 3.

INDUSTRIAL APPLICABILITY

The honeycomb structures according to the present invention can be used as a trapping filter for removing particulates etc. contained in exhaust gas emitted from a direct injection type gasoline engine, a diesel engine, or the like.

DESCRIPTION OF REFERENCE NUMERALS 1, 21 partition walls
2, 22 cells
4, 24 honeycomb segments
4a, 24a outermost segments
4b, 24b central segments
5, 25 plugging portions
8, 28 honeycomb segment bonded bodies
11, 31 inflow end faces
12 outflow end face
13, 33 circumferential walls
14, 34 bonding layers
14a circumferential bonding layer (specific circumferential bonding layer)
14b, 34b central bonding layers
34a circumferential bonding layer 100, 200, 300, 400, 500 honeycomb structures
L1 first direction
L2 second direction
O centroid (centroid of honeycomb segment bonded body)
P intersection point (intersection point at which circumferential bonding layer and circumferential wall intersect)
OP line segment
θ1, θ2, θ3, θ4, θ5 angles (angle between first direction and second direction)

What is claimed is:

1. A honeycomb structure comprising:
a plurality of prismatic columnar honeycomb segments;
bonding layers that bond side faces of the plurality of honeycomb segments with respect to each other; and
a circumferential wall that is disposed to surround an outer circumference of a honeycomb segment bonded body obtained by bonding the honeycomb segments with the bonding layers in a state where the honeycomb segments are arrayed in a grid pattern, wherein
each of the honeycomb segments includes porous partition walls disposed to surround a plurality of cells extending from an inflow end face to an outflow end face in an axial direction and a segmented outer wall disposed to surround the partition walls,
an end of each of the cells in each of the honeycomb segments is plugged by a plugging portion at any one of the inflow end face and the outflow end face,
the bonding layers include circumferential bonding layers which bond outermost segments arranged on an outermost circumference of the honeycomb segment bonded body and central bonding layers which bond central segments other than the outermost segments,
in the inflow end face of the honeycomb segment bonded body, a direction of extension of at least one of the circumferential bonding layers is defined as a first direction L1 and a direction of extension of a line segment OP that connects a centroid O of the honeycomb segment bonded body and an intersection point P at which the circumferential bonding layer in the first direction L1 intersects with the circumferential wall is defined as a second direction L2,
a size of an angle θ between the first direction L1 and the second direction L2 is 25 to 45°, and
the outermost segment, which is bonded by the circumferential bonding layer having the size of the angle θ of 25 to 45°, exists on a line passing through the centroid O of the honeycomb segment bonded body and is parallel to a direction of extension of the central bonding layers in the inflow end face of the honeycomb segment bonded body.

2. The honeycomb structure according to claim 1, wherein a number of the circumferential bonding layers having the size of the angle θ of 25 to 45° in the inflow end face of the honeycomb segment bonded body is two to eight.

3. The honeycomb structure according to claim 1, wherein a shape of the central segments in the inflow end face of the honeycomb segment bonded body is a quadrangle.

4. The honeycomb structure according to claim 2, wherein a shape of the central segments in the inflow end face of the honeycomb segment bonded body is a quadrangle.

5. The honeycomb structure according to claim 1, wherein a width of each of the bonding layers in the inflow end face of the honeycomb segment bonded body is 0.3 to 3.0 mm.

6. The honeycomb structure according to claim 2, wherein a width of each of the bonding layers in the inflow end face of the honeycomb segment bonded body is 0.3 to 3.0 mm.

7. The honeycomb structure according to claim 3, wherein a width of each of the bonding layers in the inflow end face of the honeycomb segment bonded body is 0.3 to 3.0 mm.

8. The honeycomb structure according to claim 4, wherein a width of each of the bonding layers in the inflow end face of the honeycomb segment bonded body is 0.3 to 3.0 mm.

* * * * *